United States Patent Office 3,152,184
Patented Oct. 6, 1964

3,152,184
CATALYTIC HYDROGENATION OF NITRILES
Dewey R. Levering, Wilmington, Del., assignor to Hercules Powder Company, Wilmington, Del., a corporation of Delaware
No Drawing. Filed Jan. 19, 1962, Ser. No. 167,430
8 Claims. (Cl. 260—570.9)

This invention relates to the preparation of amines, and more particularly to a new process for the preparation of primary and secondary amines by the catalytic hydrogenation of nitriles.

Amines, and particularly primary and secondary amines, are of great utility in chemical industry, and the literature contains many references for the preparation of amines by various means. The heterogeneous catalytic hydrogenation of nitriles to amines is well known where the catalysts are solids such as Raney nickel or copper chromite or finely divided cobalt. It has also been proposed to prepare amines by reacting an aliphatic nitrile with a mixture of carbon monoxide and hydrogen having a mole ratio of carbon monoxide to hydrogen from 1:10 to 3:1 in the presence of a carbonyl of a Group VIII metal of atomic number 27 through 44, namely, carbonyls of cobalt, nickel and ruthenium.

However, the heterogeneous catalytic hydrogenation of nitriles with solid catalysts, while producing principally primary and secondary amines, is subject to loss of activity by the catalyst by various causes, such as erosion or corrosion of the catalyst particles, poisoning, mechanical fouling by deposition of insoluble high molecular weight by-product impurities, and the like. Solid catalysts also often give rise to heat transfer problems and other mechanical difficulties. On the other hand, homogeneous hydrogenation of nitriles with a mixture of carbon monoxide and hydrogen employing a carbonyl of cobalt, nickel, or ruthenium, although overcoming many of the faults of heterogeneous catalytic methods, produces predominantly tertiary amines or polyamines, with only insignificant production of secondary amines, and no primary amines at all.

It is an object of the present invention, therefore, to provide a new method for the preparation of primary and secondary amines by catalytic hydrogenation of nitriles whereby problems encountered in the heterogeneous catalytic hydrogenation of nitriles to amines are substantially overcome.

It is a further object of the present invention to provide a new method for the preparation of primary and secondary amines by catalytic hydrogenation of nitriles, which is characterized by low catalyst cost, easy processing, and substantial yields of the products sought, namely, primary and secondary amines.

Generally described, these objectives and others are accomplished in accordance with the present invention by subjecting a nitrile to hydrogenation with a gas consisting essentially of hydrogen at an elevated temperature between about 100° C. and about 300° C. and superatmospheric pressure of at least about 500 pounds per square inch in the presence of a catalyst selected from the group consisting of iron carbonyl and nickel carbonyl. It has been demonstrated that iron carbonyl and nickel carbonyl are specific hydrogenation catalysts in accordance with this invention. It has also been found that cobalt carbonyl is not a catalyst for hydrogenation of nitriles to primary and secondary amines in accordance with this invention.

The nature of the catalytic mechanism of this invention is not known. It has been postulated, however, that perhaps there are complexes formed between the iron or nickel carbonyl and the nitrile. There is some evidence to support such a mechanism, since refluxing a mixture of either iron or nickel carbonyl and a nitrile in an inert atmosphere resulted in a slow displacement of carbon monoxide, and the infrared spectra of the metal carbonyl was changed. However, in most cases, it has not been possible to isolate such complexes. On the other hand, it is possible to charge the nitrile and iron or nickel carbonyl directly to the reactor without previous treatment and still get catalytic hydrogenation of the nitrile to primary and secondary amines in accordance with this invention. However, irrespective of the mechanism involved, the hydrogenation of nitriles to primary and secondary amines in the presence of iron or nickel carbonyl in accordance with this invention is truly catalytic, since only small amounts of the metal carbonyls are required to get complete reaction and some of the metal carbonyl is recoverable after the hydrogenation reaction is completed.

In practicing this invention the nitrile and the iron or nickel carbonyl catalyst, premixed if desired, are charged into a sealed pressure reactor vessel from which air has been previously displaced, preferably by sweeping out the air with nitrogen and then evacuating the vessel. Hydrogen gas is then introduced into the vessel to a pressure of at least about 500 p.s.i., preferably to a pressure between about 2,500 and about 5,000 p.s.i. The reaction vessel and contents are then heated by any suitable means to a temperature between about 100° C. and about 300° C., and sufficient to promote hydrogenation of the nitrile in the presence of the catalyst, as evidenced by consumption of hydrogen. The reaction is continued at the elevated reaction temperature, supplying addition hydrogen as needed to maintain the desired hydrogen pressure within the vessel, until no further hydrogen is consumed, as evidenced by reaching a static hydrogen pressure within the vessel, thus indicating completion of the hydrogenation reaction. Thereafter the reaction mixture is permitted to cool, the reaction vessel is opened, and the contents discharged. The primary and secondary amines formed are recovered from the reaction mixture by distillation or other means known to those skilled in the art.

The general nature of the invention having been set forth, the following examples illustrate some specific embodiments of the invention. It is to be understood, however, that the invention is in no way limited to the examples, since this invention may be practiced by the use of various modifications and changes within the scope of the invention as herein described.

*Example 1*

Acetonitrile (100 ml.) was placed in a 250 ml. flask fitted with a reflux condenser and a mercury bubbler. The system was flushed with nitrogen and 1.5 cc. of iron carbonyl was injected using a syringe. The mixture was refluxed for 3.5 hours. Gas was evolved.

A 500 ml. stainless steel pressure reactor vessel was sealed and pressure tested. It was then vented and evacuated. The solution of acetonitrile and iron carbonyl prepared above (79.5 grams) was drawn into the reactor vessel. The reactor vessel was then placed in a rocker and hydrogen was introduced thereinto to 2,500 p.s.i. The reactor was heated to 200° C. where reaction started as shown by a drop in pressure. Hydrogen pressure was then raised to 4,500–5,000 p.s.i. and the reaction continued for 9.5 hours, during which time the pressure within the reactor was maintained at 4,500–5,000 p.s.i. by introducing hydrogen as needed. Thereafter the reactor was cooled and the product which was a light-colored, amine-smelling liquid, weighing 67.7 grams, was recovered. Infrared spectra and amine titrations showed the presence of only ethyl amine and diethyl amine in conversions of 66% and 21.7%, respectively. No nitrile and no tertiary amine was present in the product.

*Example 2*

A 500 ml. stainless steel pressure reactor vessel was sealed, pressure tested and then evacuated. A mixture of 100 ml. of benzonitrile and 1.5 ml. of iron carbonyl was introduced into the evacuated reactor vessel. Hydrogen was then introduced into the reactor vessel to a pressure of 2,000 p.s.i., and the reactor was heated to 200° C. where reaction started as shown by gas absorption. Hydrogen pressure was then raised to 4,000–4,500 p.s.i. and the reaction continued for 5 hours, during which time the pressure within the reactor was maintained at 4,000–4,500 p.s.i. by introducing hydrogen as needed. Thereafter the reactor was cooled, and the product which was a dark liquid weighing 100 grams was recovered. Analysis of the product showed the presence of only benzyl amine and dibenzyl amine in conversions of 51% and 45.4%, respectively. No nitrile and no tertiary amine was present in the product.

*Example 3*

A 500 ml. stainless steel pressure reactor vessel was sealed, pressure tested and evacuated. A mixture of 150 cc. of propionitrile and 1.5 cc. of iron carbonyl was introduced into the evacuated reactor vessel which was then filled with hydrogen to a pressure of 2,000 p.s.i. and heated to 200° C. Reaction started at about 180° C. Hydrogen pressure was then raised to 4,000–4,500 p.s.i. and the reaction continued for 7 hours, during which time the pressure within the reactor was maintained at 4,000–4,500 p.s.i. by intrdoducing hydrogen as needed. Thereafter the reactor was cooled, and the product which was a light-colored liquid weighing 115.2 grams was recovered. Analysis of the product showed the presence of n-propylamine and di-n-propylamine in conversions of 53.3% and 41.3%, respectively. No nitrile and no tertiary amine was present in the product.

*Example 4*

A 500 ml. stainless steel pressure reactor vessel was sealed, pressure tested and evacuated. A mixture of 100 ml. of acetonitrile and 1.5 ml. of nickel carbonyl was introduced into the evacuated reactor vessel which was then filled with hydrogen to a pressure of 2,500 p.s.i. and heated to 200° C. where reaction started. Hydrogen pressure was then raised to 4,500–5,000 p.s.i. and the reaction continued for 10 hours, during which time the pressure within the reactor was maintained at 4,500–5,000 p.s.i. by introducing hydrogen as needed. Thereafter the reactor was cooled, and the product was removed and analyzed. Analysis showed the presence of ethyl amine and diethyl amine in conversions of 41% and 5.6%, respectively. Nitrile was present in the recovered product, but the amount was not determined. No tertiary amine was present in the product.

*Example 5*

A 100 ml. flask was attached to a reflux condenser and a gas buret was charged with 50 ml. of acrylonitrile. The system was flushed with nitrogen and 4 ml. of nickel carbonyl was added. Gas was evolved and a red solid crystalline complex was formed. This crystalline complex (36 grams) was charged into a 500 ml. stainless steel pressure reactor vessel in the absence of air (nitrogen atmosphere) along with 50 ml. of fresh acrylonitrile, the reactor was then sealed, filled with hydrogen to a pressure of 2,000 p.s.i. and heated to 160° C. where reaction started. Hydrogen pressure was then raised to 3,500–4,000 p.s.i. and the reaction continued for 3 hours, during which time the pressure within the reactor was maintained at 3,500–4,000 p.s.i. by introducing hydrogen as needed. Thereafter the reactor was cooled, and the product was removed and analyzed. The product, a light-colored liquid, had an infrared spectrum almost identical to that obtained upon hydrogenation of propionitrile. A 52.5% conversion to n-propylamine and 35.5% conversion to di-n-propylamine was obtained. There was no nitrile and no tertiary amine present in the product.

*Example 6*

A 500 ml. stainless steel pressure reactor vessel was sealed, pressure tested and then evacuated. One hundred grams (100 g.) of adiponitrile and 1.5 ml. of iron carbonyl were introduced into the evacuated reactor vessel. Hydrogen was then introduced into the reactor vessel to a pressure of 2,000 p.s.i., and the reactor was heated to 200° C. Reaction started at about 190° C. Hydrogen pressure was then raised to 4,500 p.s.i. and the reaction continued for 8 hours, during which time the pressure within the reactor was maintained at 4,000–4,500 p.s.i. by introducing hydrogen as needed. Thereafter the reactor was cooled, vented, and the product was removed. The product, weighing 90.4 grams, consisted of crystalline solid and some brown liquid. The product was purified by distillation, and consisted essentially of a mixture of hexamethylene diamine and secondary amines derived from hexamethylene diamine. There was no nitrile and no tertiary amine present in the product.

Any monomeric nitrile having the general formula $R(C \equiv N)_n$ is catalytically hydrogenated by hydrogen gas to primary and secondary amines in the presence of iron carbonyl or nickel carbonyl in accordance with this invention. In the above general formula $n$ is any whole number from 1 to 4, inclusive, preferably 1 or 2, and R may be any organic radical which will not react with the metal carbonyl catalyst to inactivate the catalyst, in other words, which is inactive with respect to reaction with the metal carbonyl catalyst to inactivate the catalyst. R, therefore, may be any organic radical of aliphatic, alicyclic, aromatic, aliphatic-aromatic, aromatic-aliphatic, or heterocyclic structure including by way of example hydrocarbon radicals and substituted hydrocarbon radicals containing substituent hydroxyl, keto, carboxyl, aldehyde, ether, amine, amide, imide, nitro, nitroso, mercapto, thio, dithio, sulfinyl, sulfonyl, and the like groups in any combination. Organic radicals containing halogen substituent groups do not come within the scope of this invention because such halogen substituent groups react with the iron carbonyl or nickel carbonyl catalyst to inactivate the catalyst.

Nitriles of the above general formula $R(C \equiv N)_n$ in which R is any straight or branched chain, saturated or unsaturated aliphatic hydrocarbon radical, as well as alicyclic, aromatic, aliphatic-aromatic, and aromatic-aliphatic hydrocarbon radicals containing 1 to 18 carbon atoms are most preferred for the purposes of this invention. Other preferred nitriles of the above general formula $R(C \equiv N)_n$ are those in which R represents organic radicals containing only carbon, hydrogen and oxygen, such as organic acid radicals, alcohol and phenol radicals, ether radicals, carbonyl radicals, and aldehyde radicals. Furthermore, it is to be understood that the presence of such hydrogen-reducible groups as ethylenic or acetylenic unsaturation, aldehydic, or keto groups in the nitrile does not make such nitriles inoperative for the purposes of this invention, since catalytic hydrogenation for the nitrile group or groups will produce primary and secondary amines in accordance with this invention irrespective of the presence of other hydrogen-consuming groupings in the nitrile. For example, catalytic hydrogenation of acrylonitrile in accordance with this invention leads to production of a mixture of n-propyl amine and di-n-propyl amine.

Some typical nitriles suitable for the purposes of this invention include, by way of example, but not in limitation of the invention, formonitrile, acetonitrile, propionitrile, butyronitrile, isobutyronitrile, capronitrile, caprylonitrile, myristonitrile, lauronitrile, stearonitrile, acrylonitrile, crotononitrile, hexenonitrile, 3-octenenitrile, oleonitrile, tridecanenitrile, 2-butynenitrile, 2,4-pentadienenitrile, 1-cyclopentanecarbonitrile, 1-cyclohexanecarbonitrile, 1,3-cyclopentadiene-5-carbonitrile, succinonitrile, adiponitrile, sebaconitrile, 1,4-dicyanobutene-2, 1,4-dicyanobutene-1, dodecanedinitrile, 1,3,5-pentanetricarbonitrile; 1,4-cyclohexanedicarbonitrile, 1,4 - cyclohexanetetracarbonitrile, 1,1,3-cyclohexanetripropionitrile, benzonitrile, 2-naphthonitrile, isophthalonitrile, 1-phenylpropionitrile, trimesonitrile, α-ethyl-β-oxo-capronitrile, isonipicotonitrile, 5-pyrimidinecarbonitrile, 2-cyano-3-heptenoic acid, α-cyanoacetamide, p-cyano-benzaldehyde, α-cyano-glutarimide, α-hydroxyisobutyronitrile, 2 - benzimidazoleacetonitrile, phenylacetonitrile, valeronitrile, ethyl cyanoacetate, phenoxybutyronitrile, cyanoacetamide, malononitrile, 3-butenenitrile, cyanoacetic acid, undecanenitrile, β-isopropoxypropionitrile, β-methoxypropionitrile, toluonitrile, anisonitrile, and the like.

The catalysts of this invention are limited to iron carbonyl and nickel carbonyl. Both of these materials are well known and are readily commercially available as iron pentacarbonyl and nickel tetracarbonyl.

The amount of iron carbonyl or nickel carbonyl can be as little as 0.5% by weight, based on the weight of the nitrile. Generally, however, it is preferred to use between about 1% and 5% of the iron carbonyl or nickel carbonyl, since improved reaction rates are readily obtainable within the preferred range. There is no advantage to be gained by the use of iron carbonyl or nickel carbonyl in excess of about 10% by weight, based on weight of the nitrile, either in reaction rate or yield of primary and secondary amines.

The iron carbonyl or nickel carbonyl catalysts of this invention may be mixed with part or all of the nitrile in a substantially oxygen-free atmosphere prior to introduction into the reactor vessel. If desired, however, the metal carbonyl catalyst and the nitrile can be charged separately directly into the reactor vessel from which air has previously been replaced by an inert atmosphere such as nitrogen and then evacuated.

Hydrogen gas, unmodified by any other gas, is charged under pressure into the reactor vessel as the hydrogenating gas of this invention. It follows, therefore, that the hydrogenating atmosphere within the reactor vessel during the reaction consists essentially of hydrogen gas, since only insignificant amounts of nitrogen or other inert gas which might be present after evacuation of the reactor vessel, and only insignificant amounts of carbon monoxide which might be derived from initial possible reaction of the metal carbonyl catalyst with the nitrile would be present during the reaction, and the minute amounts of these gases which might be present do not have have any detectable effect, either on rate of reaction or the composition of the products produced.

The process is generally operated under a hydrogen pressure of at least about 500 p.s.i., preferably between about 2,000 p.s.i. and about 5,000 p.s.i., since optimum results from the standpoint of rate of reaction and yield are realized when the process is operated within the preferred range. The upper pressure at which the process can be operated is determined only by the structural limitations of the reaction vessel used.

The temperature at which the catalytic hydrogenation of nitriles in accordance with this invention can be effected can vary between about 100° C. and about 300° C. Since good reaction rates and good yields of primary and secondary amines are obtained in the range between about 150° C. and about 225° C., that is the temperature range generally employed. It will be understood, of course, that the optimum temperature and pressure employed depend somewhat upon the nitrile and the metal carbonyl used for catalyst. In any case, a suitable temperature and pressure will be chosen which promote a reasonably good reaction rate.

The catalytic hydrogenation of this invention is considered to be complete when there is no further observed pressure drop; in other words, hydrogen pressure within the reaction vessel remains static upon completion of the reaction. This generally requires from about 3 hours to about 20 hours.

An inert organic solvent or diluent is not necessary but may be employed if desired, and may be advantageous particularly where the reaction is highly exothermic. Substantially any organic solvent or diluent which is inactive both with respect to reaction with the metal carbonyl catalyst and the nitrile will be satisfactory. Suitable inert organic solvents or diluents include, by way of example, methanol, ethanol, methyl acetate, benzene, cyclohexane, heptane, petroleum ether, dioxane, diethyl ether, and the like. The amount of such inert solvent or diluent can vary widely, but should not be used in an amount which would greatly increase recovery costs, or interfere with isolation of the desired primary and secondary amine products.

The process of this invention may be carried out as a batch process, or as a continuous or semi-continuous process, as desired.

From the foregoing description it is apparent that this invention provides an attractive new process for production of primary and secondary amines by the homogeneous catalytic hydrogenation of nitriles, the principal advantages of the process being low catalyst cost, ease of processing, and relatively high yields of the products sought.

The foregoing detailed description has been given for clearness of understanding only and no unnecessary limitations are to be understood therefrom. It will be understood that the invention may be practiced by the use of various modifications and changes without departing from its spirit and scope with only such limitations placed thereon as are imposed by the appended claims.

What I claim and desire to protect by Letters Patent is:

1. A process for the preparation of primary and secondary amines which comprises subjecting a monomeric nitrile of the formula $R(C\equiv N)_n$ to hydrogenation with a gas consisting essentially of hydrogen at a temperature between about 100° C. and about 300° C. and a pressure of at least about 500 pounds per square inch in the presence of from about 0.5% to about 10%, by weight of said nitrile, of a catalyst selected from the group consisting of iron carbonyl and nickel carbonyl, said $n$ in the above formula being any whole number from 1 to 4, inclusive, and said R in the above formula is a hydrocarbon radical containing from 1 to 18 carbon atoms.

2. A process in accordance with claim 1 in which the catalyst is iron carbonyl.

3. A process in accordance with claim 1 in which the catalyst is nickel carbonyl.

4. A process in accordance with claim 1 in which the nitrile is acetonitrile.

5. A process in accordance with claim 1 in which the nitrile is benzonitrile.

6. A process in accordance with claim 1 in which the nitrile is propionitrile.

7. A process in accordance with claim 1 in which the nitrile is acrylonitrile.

8. A process in accordance with claim 1 in which the nitrile is adiponitrile.

References Cited in the file of this patent

UNITED STATES PATENTS 2,644,842    Hager _____ June 14, 1950

OTHER REFERENCES

Sabatier: Catalysis in Organic Chemistry, p. 51 (1922).